COLOR TUBE

Filed Nov. 29, 1950

INVENTOR.
Kurt Schlesinger
BY
Foorman L. Mueller
Atty.

July 17, 1956 K. SCHLESINGER 2,755,410

COLOR TUBE

Filed Nov. 29, 1950 4 Sheets-Sheet 2

INVENTOR.
Kurt Schlesinger
BY
Foorman L. Mueller
Atty.

INVENTOR.
Kurt Schlesinger
BY
Foorman L. Mueller
Atty.

INVENTOR.
Kurt Schlesinger
BY
Foorman L. Mueller
Atty.

United States Patent Office 2,755,410

Patented July 17, 1956

2,755,410

COLOR TUBE

Kurt Schlesinger, Maywood, Ill., assignor to Motorola, Inc., Chicago, Ill., a corporation of Illinois Application November 29, 1950, Serial No. 198,117

26 Claims. (Cl. 315—12)

This invention relates generally to apparatus for providing color television and more particularly to an electronic color tube in which the beam is guided along a screen for scanning three primary colors in a predetermined manner.

Various systems have been proposed for the transmission of color pictures by television but these systems have not been entirely satisfactory for various reasons. One of the foremost reasons has been the absence of transmitting and reproducing tubes having electronic means for guiding the beam of the tube so that the screen is scanned with sufficient accuracy to selectively transmit and reproduce the various colors. In prior attempts made to produce such a tube, electrical polarization of the various elements providing the different colors has been attempted so that these elements will selectively attract the beam of the cathode ray tube. Such tubes have not been satisfactory because for high definition and picture brightness the laminations must be very fine and very close together and since high voltages are required on the adjacent laminations the difficulty of insulation breakdown has made such systems unsatisfactory.

Another type of tube which has been proposed is one in which the beam is direction controlled, with the beam passing through apertures in a mask to selectively impinge different portions of the screen and thereby select different colors depending upon the angle of incidence of the beam with respect to the screen. Such tubes have the disadvantage that the beam is intercepted by a mask plate and only a very small amount of the beam passes through the mask so that the signal produced at the transmitter and the brightness of the picture produced at the receiver are substantially reduced. A further difficulty is that such tubes have very critical dimensions so that the manufacture thereof is quite expensive and critical.

It is therefore an object of the present invention to provide an improved system for producing color television.

A further object of this invention is to provide a color tube in which the cathode ray beam is guided so that it follows the pattern of color elements on a screen.

A further object of this invention is to provide a color tube in which the cathode ray beam is deflected to selectively pass through spaced openings for controlling the direction of the beam and is further guided before it impinges the screen of the tube.

A still further object of this invention is to provide a tube for reproducing the three primary colors which is of such construction that it is suitable for production manufacture.

A feature of this invention is the provision of a cathode ray tube having a screen formed of elements which correspond to various primary colors, with the beam being guided across the screen in accordance with its position with respect to a grid.

A further feature of this invention is the provision of a color tube including a screen made of portions corresponding to various colors and a grid having portions positioned in a predetermined manner with respect to the color portions, with the grid providing secondary emission in accordance with the position of the electron beam with respect thereto and thereby controlling the deflection of the beam.

A still further feature of this invention is the provision of a color television tube having a cathode ray beam the position of which is controlled by secondary emission from a pair of grids within the tube so that the cathode ray tube is held in three predetermined positions with respect to the position of the grid. A circuit may be provided for controlling the deflection of the beam in accordance with gating waves so that the various positions of the beam may be selectively provided.

Another feature of this invention is the provision of a color television cathode ray tube in which the beam is deflected to be selectively passed through apertures in a plate adjacent the beam source with the beam thereafter being focussed to provide a restricted beam of electrons which impinges the screen at different angles depending upon the aperture through which the beam is passed.

Still another feature of this invention is the provision of a color tube having a single grid for controlling the beam between two predetermined positions for precise scanning of a color screen. A gating circuit may be provided in such a system for controlling the beam so that it selectively impinges elements of three different colors to thereby provide three color reproduction from scanning in the two different positions.

A further feature of this invention is the provision of a color tube including grids for controlling the position of the beam with respect to elements forming the screen in which the grids are formed by depositing material upon a portion of the screen. The grids may be formed by depositing carbon black or the like on a metal sheet provided at the tube screen.

Yet another feature of this invention is the provision of a color tube including a grid structure for controlling the position of the beam of the tube in which the material forming certain of the colors are provided on portions of the grid structure so that these colors are selectively scanned when the beam follows along the grid portions.

Further objects, features and the attending advantages of the invention will be apparent from a consideration of the following description when taken in connection with the accompanying drawings in which.

In practicing the invention there is provided a cathode ray television tube including means for producing a beam of electrons and a screen formed of color elements on which the beam impinges. This tube may be either for transmitting or reproducing purposes with the different elements being activated by different colors in a transmitting tube and producing various different colors in a receiving tube. These elements individually correspond to the three primary colors, green, blue, and red, and are positioned in a laminated form. For guiding the beam so that it moves in a desired manner with respect to the various color laminations, a grid structure is provided including portions which extend parallel to the laminations of the screen. The grid structure is made of conducting material so that when the beam strikes, the same, secondary emission is produced. This secondary emission is used to develop a voltage which is a measure of the distance of the beam from the grid portions, and which is used for providing an auxiliary deflection field for deflecting the beam. It will therefore appear that when the beam is in a certain position the main deflection field and the auxiliary deflection field will combine to provide a field which holds the beam in a fixed stable position with respect to the grid. When the beam is in other positions the combined fields will be such to cause the beam to move back of its stable position until the deviation reaches a predetermined amount when the beam will jump to the next stable position. Reversal of the polarity of the auxiliary field with respect to the main field is effective to shift the stable positions so that by providing switching means different stable positions can be selectively provided. By the use of two grids with the portions thereof interspersed, it is possible to obtain three stable positions between each pair of adjacent grid portions, and elements representing the three colors may be selectively scanned between adjacent grid portions. Keying circuits may be provided so that interlaced fields, lines, or dots of the three colors may be scanned as may be desired in any particular color television system.

The tube may include an apertured plate adjacent the electron gun across which the beam is deflected before it is focussed to provide beams impinging the screen from various angles of incidence. By guiding such a beam adjacent the screen a plurality of accurately controlled positions may be obtained. The fluorescent elements may be provided in a laminated pattern on a screen as previously stated, or certain of the elements may be provided on the grids themselves so that when the beam follows along close to the grids the fluorescent material thereon will reproduce the desired color. The grids may be provided as separate conducting elements within the tube or may be deposited on a metallic sheet as is commonly used within cathode ray picture tubes.

Figures 1, 2, 3:
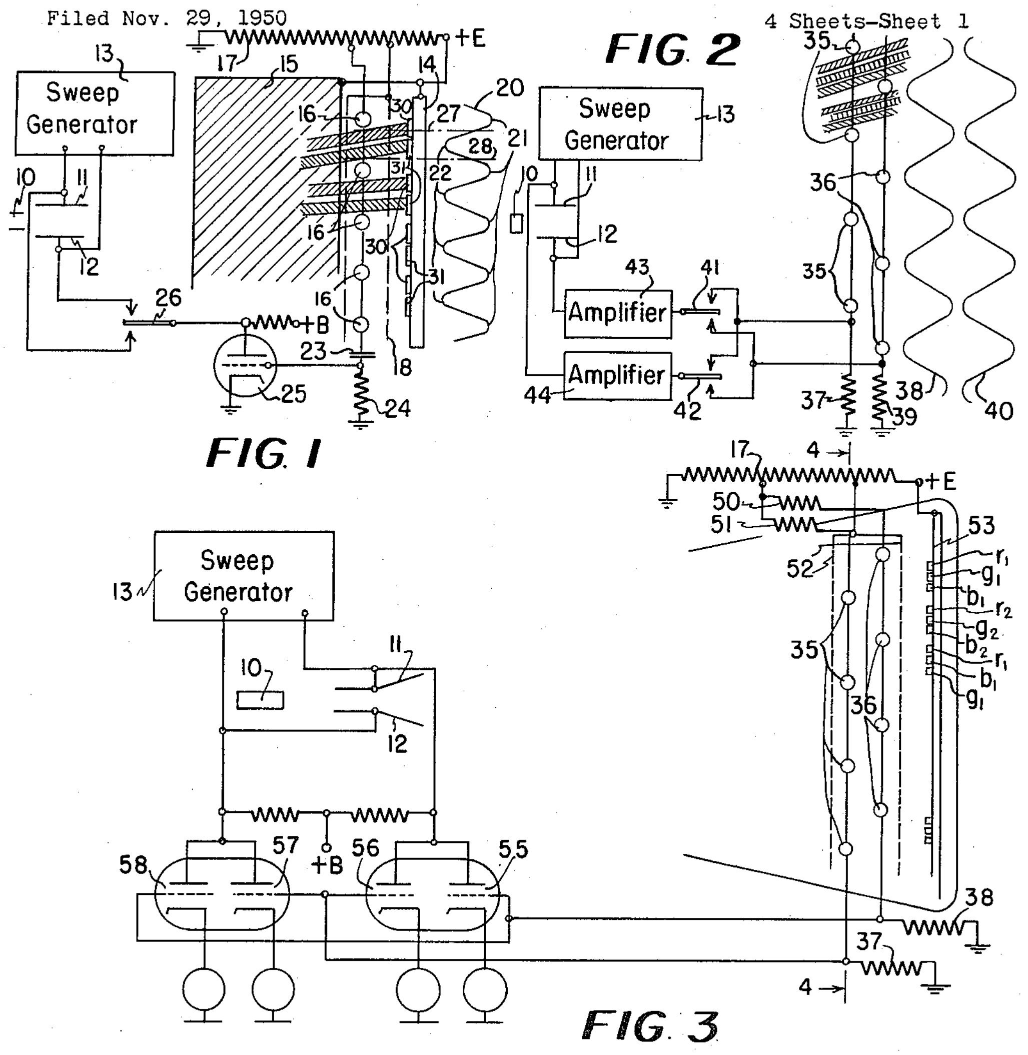
Fig. 1 illustrates the basic principles of the system in accordance with the invention.
Fig. 2 illustrates a structure for providing three beam positions.
Fig. 3 illustrates more in detail one embodiment of the system of Fig. 2.

Referring now to the drawings, in Fig. 1 there is shown schematically a cathode ray tube incorporating the principles of the invention. This tube includes electron gun 10 for producing a cathode ray beam, which gun may include means for accelerating and focussing the beam. Deflection plates 11 and 12 are provided for controlling the vertical position of the beam and are energized by sweep generator 13. The beam is directed on a screen 14 which is connected to the high potential point of a high voltage supply. This high potential may also be applied to an element 15 which may be a coating inside the envelope of the tube as in standard cathode ray tube structures. To guide the beam from the gun 10 so that the vertical position thereof is very accurately controlled, a grid structure is provided including a plurality of interconnected portions 16, which are parallel to each other and extend horizontally. In Fig. 1, end views of the portions are shown, the various portions being interconnected so that they are all at the same potential. This grid is connected to a lower point on the feeder resistor 17 of the power supply and may be surrounded by a suppressor grid 18 connected to a point of higher potential, but of lower potential than the screen 14. The suppressor grid 18 may have portions on either side of the grid 16 and may be constructed of very fine wires, substantially at right angles to the beam guide 16 which are widely spaced so as not to substantially interfere with the cathode ray beam.

When the cathode ray beam passes the grid portions 16, secondary emission will be produced at the grid. The amount of secondary emission will depend upon the nearness of the beam to the portions of the grid. This is illustrated by the curve 20 of Fig. 1 which indicates the emission will be maximum at points 21, which are aligned with the grid portions 16, and minimum at points 22 which are farthest spaced from the grid portions. The grid 16 is coupled through condenser 23 to resistor 24 so that a varying voltage is produced across the resistor 24 depending upon the emission from the grid 16. The voltage across the resistor 24 is applied to the grid of amplifier stage 25 and the amplified voltage selectively applied to one of the deflector plates through the switch 26. The amplifier will therefore provide an auxiliary field varying in amplitude with the secondary emission from the grid and which will tend to shift the position of the beam with respect to the portions 16 of the grid.

The auxiliary field produced by the secondary emission from the grid may be applied in either polarity depending upon whether the amplifier is connected to the plate 11 or to the plate 12. When the switch 26 is in the upper position so that the amplifier is connected to the deflecting plate 12, the field produced by the secondary emission will oppose the field produced by the sweep generator 13 when the beam is adjacent the underside of any one of the grid portions. This is represented by the dot-dash line designated 27 under the top grid portion, and there will be corresponding positions below each of the grid portions 16. Therefore, when the switch is in the upper position the field produced by the system illustrated will tend to hold the beam along the bottom edge of the grid portions to thereby provide accurate guiding of the beam. Conversely when the switch 26 is moved to the lower position so that the voltage therefrom is applied to the upper deflecting plate 11, the field resulting from secondary emission will oppose the field from the sweep generator to provide a stable position when the beam is immediately above any one of the grid portions 16 as represented by the dot-dash line 28. This will provide a second stable position just above each of the grid portions 16. By providing layers or bands of fluorescent material along the screen which produce different colors, it is thereby seen that the beam can be made to selectively scan the layers in the two positions depending upon the position of the switch 26. That is, the layers 30 may produce one color and the layers 31 a second color and these colors may be scanned in any desired pattern to provide color reproduction.

For providing satisfactory color reproduction, it has been determined that it is necessary to reproduce at least three colors. Accordingly, it is desirable to provide a beam guiding system in which three different positions of the beam are provided which can be used to reproduce the three different colors. Such a system may be provided by the use of two grids as illustrated in Fig. 2. In this figure, the electron gun 10, deflection plates 11 and 12 and sweep generator 13 may be identical to the corresponding element of Fig. 1. The two grids 35 and 36 include portions staggered with respect to each other and each provides a voltage in substantially the same manner as the grid 16 of Fig. 1. The grid 35 provides a voltage across resistor 37 which varies with the position of the beam with respect to the grid 35 in the manner illustrated by the curve 38. Similarly, the grid 36 provides a voltage across resistor 39 which varies in accordance with the position of the beam with respect to the grid 36 in the manner illustrated by the curve 40. Switches 41 and 42 and amplifiers 43 and 44 are provided for selectively providing fields on the plates 11 and 12 in accordance with the positions of the switches.

Considering the operation of the system of Fig. 2, when the switch 41 is connected to either resistor 37 or 39 and the switch 42 is open, the beam will be held in a position along the bottom edge of a portion of the grid 35 or of a portion of the grid 36 respectively. Similarly, when the switch 42 is connected to either of the resistors 37 or 39 and the switch 41 is open, a voltage is applied to the plate 11 which causes the beam to take a position along the top of a portion of the grid 35 or 36, as the case may be. This will provide the positions for two colors. To provide positions for a third color, the deflecting plates 11 and 12 may be simultaneously energized, with the plates being individually connected to the resistors 37 and 39. This will cause the beam to take a position which is substantially midway between one element of the grid 35 and the adjacent element of the grid 36. In the event that switch 42 is connected to resistor 37 and switch 41 is connected to the resistor 39, the beam will take a position above a portion of the grid 35 and below the adjacent portion of the grid 36, and conversely, when the switch 42 is connected to resistor 39 and switch 41 is connected to resistor 37 the beam will take a position above a portion of the grid 36 and below a portion of the adjacent grid 35. It is therefore seen that by the various positions of the switches 41 and 42, the beam can be controlled to three different positions between each adjacent pair of grid portions.

Figure 4:
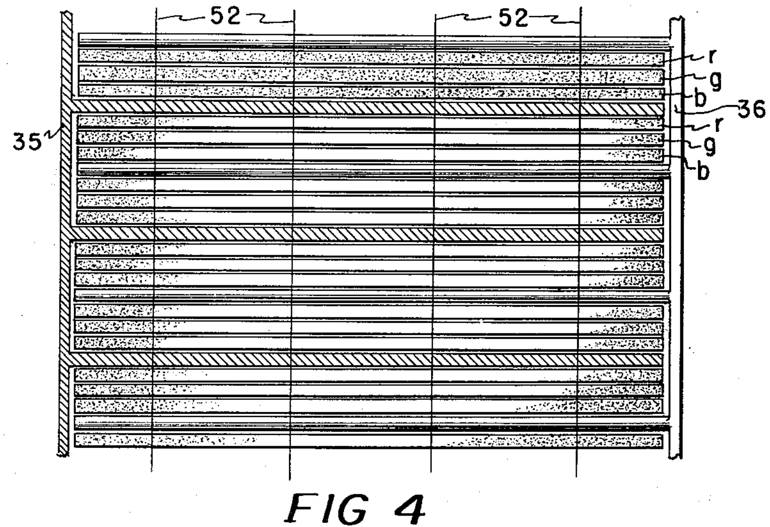
Fig. 4 is a view along the lines 4—4 of Fig. 3.

Referring now to Figs. 3 and 4, these figures illustrate more in detail the system shown generally in Fig. 2. Accordingly, the same reference characters are used to designate the corresponding elements. The grids 35 and 36 are illustrated as connected through resistors 50 and 51 to a point on the high voltage bleeder 17 below the maximum plus E which is connected to the screen. Suppressor grid 52 is connected to a point at a potential between that of the grids 35 and 36 and the potential of the screen. It is to be pointed out that although only four elements are illustrated as forming each grid, it will be necessary to provide the member of element equal to one-half the number of lines of each color to be reproduced. Therefore the spaces between the innerleaved portions of the two grids will define the lines of the various colors. The screen 53 includes three layers positioned in the space between adjacent grid portions which when impinged by the cathode ray beam will produce the colors, red, green and blue respectively. These elements are indicated *r*, *g*, and *b*. The red portions are impinged by the beam when it is held in a position just below the longitudinally extending portions of the grids, the blue portions of the screen are struck when the beam is just above the longitudinally extending portions of the beam, and the green portions are struck when the beam is positioned centrally with respect to the adjacent grid portions.

Figure 5:
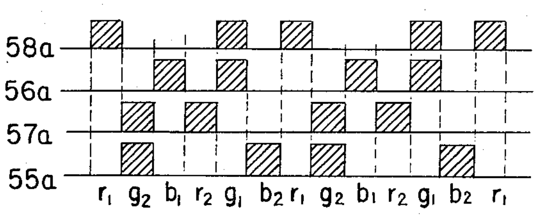
Fig. 5 is a chart showing the gating waves for the system of Fig. 3.

The voltages developed across resistors 37 and 38 in accordance with the secondary emission from the grids 35 and 36 are applied to the deflection plates 11 and 12 through amplifier stages formed by the triodes 55, 56, 57 and 58. The triodes 55 and 58 have the grids thereof connected across the resistor 38 and the triodes 56 and 57 have the grids thereof connected across the resistor 37. The plates of the triodes 55 and 56 are connected to deflecting plate 11 and the plates of the triodes 57 and 58 are connected to the deflecting plate 12. In order to eliminate mechanical switching, the tubes are selectively rendered conducting by gating pulses which may be applied to the cathodes thereof. The tubes may be biased in any manner so that they will not conduct until a gating pulse is applied thereto. The waves of gating pulses required so that the beam will scan the red, green and blue portions of the fluorescent means on the screen is illustrated in Fig. 5 with the waves 55*a*, 56*a*, 57*a* and 58*a* being the waves applied to the cathode of the triode sections 55, 56, 57 and 58 respectively. The gating waves are shown in Fig. 5 in the proper timed relation to cause the red, green and blue portions to be scanned in that order with alternate lines interlaced. That is the fields will be scanned as follows; $r_1$, $g_2$, $b_1$, $r_2$, $g_1$, $b_2$, $r_1$, $g_2$ and so forth.

Considering now the operation of the system of Fig. 3 by the pulse waves of Fig. 5, the first pulse of wave 58*a* will render the triode 58 conducting. This will cause the beam to take a position just below the top portion of grid 36 so that the element $r_1$ will be scanned to reproduce red. To provide the $g_2$ field, which appears next to interlace the lines, pulses 57*a* and 58*a* appear simultaneously to render both the triodes 58 and 56 conducting so that the beam takes a position substantially centrally below the grid 35 and above the grid 36. The pulse 56*a* then appear so that the tube 56 is rendered conducting to provide a field which causes the beam to take a position above a portion of the grid 35 to thereby scan the fluorescent portion $b_1$ for reproducing blue. The various gating pulses are of long enough duration for the beam to scan the entire screen so that in addition to scanning the red section below the upper grid portion 36 it also scans the red portion below all of the grids 36 to thereby scan all the elements $r_1$. Similarly, all of the green lines $g_2$ above grid portions 36 and below grid portion 35 will be scanned before the gating pulse changes, and then all of the blue lines $b_1$.

To scan the intermediate color layers the pulse wave 57*a* is effective to render the triode 57 conducting to cause the beam to follow immediately below the portions of the grid 35 to thereby scan the alternate red portions $r_2$. The gating pulse 58*a* and 56*a* then arrives so that triodes 58 and 56 are rendered conducting. This causes the beam to assume an intermediate position below the grid 36 and above the grid 35 to provide the $g_1$ lines. The pulse 55*a* then appears to render the tube 55 conducting alone so that the beam takes the position immediately above the grid 36 to strike the alternate blue lines $b_2$.

The grid structures in the embodiments previously described may be formed in various manners to provide relatively inexpensive constructions. These grids may be formed of thin sheets of conducting material such as copper which are supported in frames made of any suitable material. The sheets may then be photographically treated and etched so that only the grid portions thereof remain. By such a process two grids may be made which are exactly identical and the matrix used in forming the grids may also be used in depositing the fluorescent material on the screen so that the fluorescent portions will be of exactly the same configuration and therefore be accurately aligned with the grid structure. By using this method, the structure can be provided having no parallax between the grid and the screen. The point source of light used for the photoengraving may be placed at the center of deflection of the tube, thus simulating the electron beam.

Figure 6:
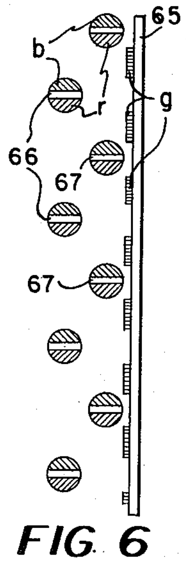
Fig. 6 illustrates another embodiment of the screen structure for use in the system of Fig. 3.

In Fig. 6 a modification of the grid and screen structure is illustrated in which the face plate is represented at 65 and the grids 66 and 67 are formed of flat strip portions extending parallel to the beam. The fluorescent material providing the various colors may then be provided partly on the screen and partly on the grids. For example, the material providing the red color may be provided on the underside of the grid portions and the material providing blue on the top side of the grid portions. Therefore, when the beam takes the position just below the grid, red will be reproduced, and when the beam takes the position just above the grid, blue will be reproduced. The green fluorescent material may be provided on the screen itself and positioned so that it is impinged by the beam when the beam takes the intermediate position between the adjacent grid portions.

Figure 7:
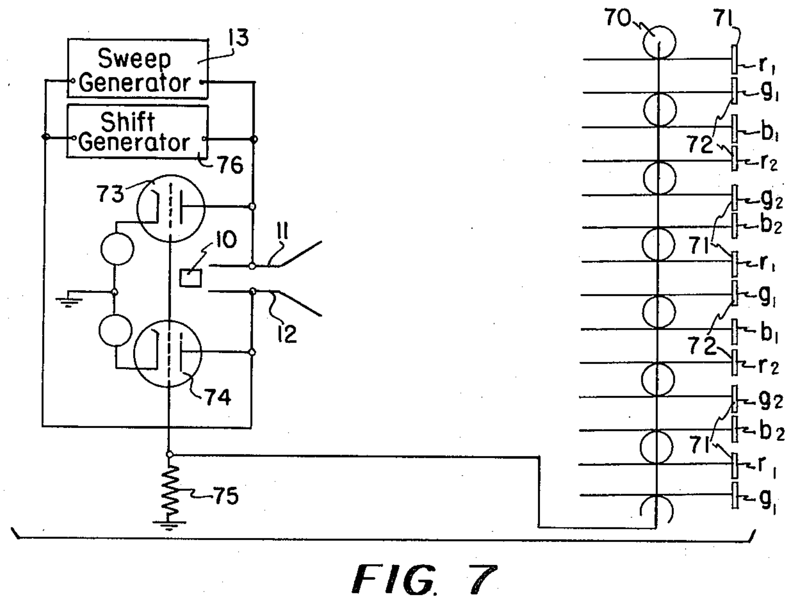
Figs. 7 and 8 illustrate systems in which three colors are provided by two beam positions.

In Fig. 7 there is illustrated a system in which three color reproduction is provided by a tube having only a single grid. This grid is designated as 70 and as previously stated the single grid will provide only two different positions of the beam with respect thereto. Accordingly, the screen includes fluorescent portions 71 and 72 positioned to be engaged by the beam when it is in these two positions. These various portions however are made of material providing three different colors marked *r*, *b* and *g* to designate red, blue and green respectively. In order to produce fields of these various colors, gating of the circuits providing deflection from the feedback, and in certain cases, an additional shift of the scanning pattern on alternate fields is required. A deflection field is provided between plates 11 and 12 by the sweep generator 13 in the usual manner and in addition a shifting field may be provided by the shift generator 76. The tubes 73 and 74 are connected in parallel across resistor 75 and provide a field from the voltage developed by the grid 70. The tubes 73 and 74 may be selectively rendered operative by synchronized gating waves provided in the cathode or grid circuits thereof.

In this system gating and sweep arrangements may be provided for scanning the portions of each color either continuously or in interlacted fashion. That is, all of the red elements may be scanned in sequence or half of the red elements may be scanned at one time and the other half at a later time to provide interlaced red fields. Assuming that all the red elements are scanned in sequence, the tube 74 will first be rendered operative to cause the beam to move along the lower edge of the top portion of the grid 70. To scan the element $r_2$ the tube 73 will be operative to cause the beam to move along the top edge of the grid portion 70 which is third from the top. It is therefore to be seen that to continue to scan all the red portions gating waves must be applied to the tubes 73 and 74 which are of one-half line frequency. When it is desired to scan the blue portions of the screen, the tube 74 will first be rendered operative so that the beam will move along the top edge of the grid 70 which is second from the top and so forth. In order to reproduce the green field, it will be necessary to shift the beam down so that it will be positioned between the second and third grids. This may be accomplished by the shift generator 76 which may be keyed to selectively provide a field to shift the beam down by one line.

The system of Fig. 7 may also be scanned to provide interlaced fields, as previously stated, by accurately controlling the shifting field. For such operation the tube 74 will continue conducting while the first red, blue and green fields are reproduced. This will cause the gating frequency of the tubes 73 and 74 to be relatively slow being one-third the field frequency. Following such a scanning procedure, the beam would first follow along the lower side of the top grid portion and every third portion below the top, to scan the screen portions designated $r_1$. Then the position of the beam would be shifted downward by the shift generator 76 so that for the next field the beam will follow the lower side of the third grid portion and every third grid portion below this to strike the screen portions $g_2$ to provide the first green field. The beam will then be shifted up to the position so that the $b_1$ portions on the under side of the second grid will all be scanned. It will be noted that during the reproduction of these red, blue and green fields, the beam always moves along the lower edge of the grid portions. Now to provide the second field of each color the tube 73 is rendered conducting so that the beam follows along the top edge of the grids. By properly shifting the beam by the shift generator 76, the $r_2$, $g_1$, and $b_2$ portions can be scanned to provide the interlacing fields.

Figure 8:
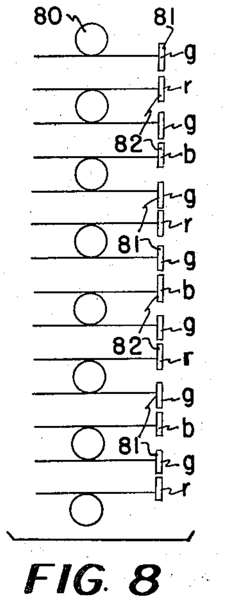

In Fig. 8 is illustrated a simplified single grid three color system which will not conform to presently proposed standards and which will result in a reduction in the resolution of the red and blue color fields. However, since it has been found that the picture resolution is principally determined by the green field, such a simplified system may provide adequate resolution and result in a much simpler overall system. Since the deflecting system may be the same as in Fig. 7 only the grid and associated fluorescent portions of the screen are illustrated in Fig. 8. The grid 80 is spaced with respect to the fluorescent portions 81 and 82 in exactly the same manner as in Fig. 7. However, in this system all of the portions 81 are of material which reproduces green and alternate portions 82 reproduce red and blue.

To scan the fluorescent portions arranged in this manner, the beam may be first controlled in the position so that it follows along the bottom edge of the grid to thereby scan all of the green portions of the screen. The beam may thereafter be arranged to scan along the top edge of the grid to reproduce the red portions. In such scanning only every other line may be scanned since the alternate lines will reproduce blue. This may be accomplished by blanking the beam for every other line so that only the red lines are reproduced. Then by repeating the scan while blanking the alternate lines, the blue lines may be reproduced. Alternatively, interlaced scanning may be provided with the beam directed to scan every other green line first and then to scan the portions forming the red field. Thereafter, the alternate green lines may be reproduced to provide a field interlaced with the first green field, and then the blue lines may be reproduced to provide a blue field. Such a combination of the reproduction of green with a reduced reproduction of red and blue may therefor be accomplished in a relatively simple manner, and as previously stated may provide the necessary resolution for good color reproduction.

Figure 9:
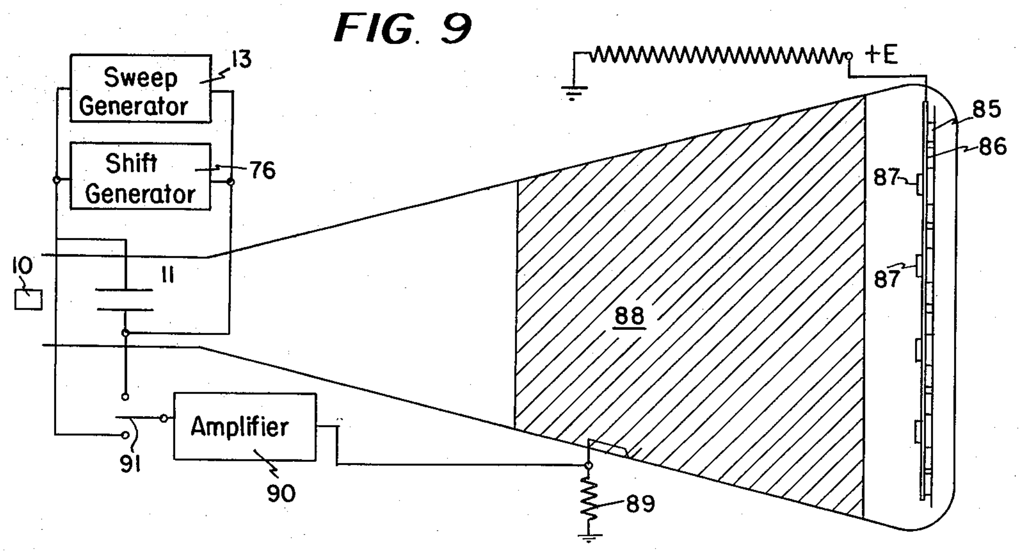
Fig. 9 illustrates a structural embodiment of a system having two beam positions.

As will be apparent from consideration of Fig. 9, the systems using single grid structures as in Figs. 7 and 8 lend themselves to simplified constructions. The fluorescent portions 85 and 86 may be deposited on the screen in any suitable manner. Then adjacent the fluorescent portions a metallized sheet is provided which may be of aluminum as is generally used in cathode ray tubes to provide very bright reproduction. The single grid may be formed of strips 87 of carbon black which are deposited along the sheet in the space between adjacent fluorescent portions. These strips of carbon black should not be interconnected with each other and no electrical connection to these strips whatever is required. It has been found that secondary emission from the metallized sheet when the beam strikes an area coated with carbon black is substantially reduced. Therefore, by making connection to the collector coating 88 within the tube, the voltage appearing across resistor 89 will vary with the position of the beam with respect to the carbon black coating. This may be applied to amplifier 90 and through switch means 91 to the deflection plates 11 and 12 in a manner to produce a field which causes the beam to follow along either the top or the bottom edge of the carbon black strips.

Figure 10:
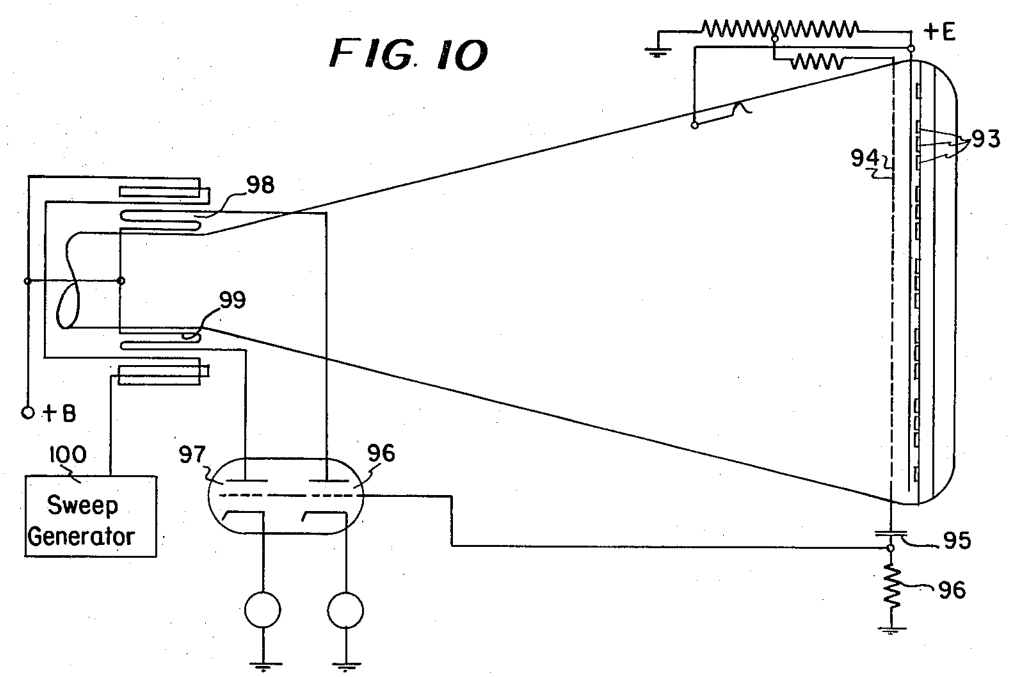
Fig. 10 illustrates the manner in which the system in accordance with the invention can be applied to electromagnetic deflection systems.

In Fig. 10 there is shown a circuit illustrating how the beam guiding principle may be applied to electromagnetic deflection systems. In this structure the screen is illustrated as including a plurality of fluorescent portions 93 which reproduce the various colors. A grid structure is shown schematically at 94 which provides a voltage applied through condenser 95 across resistor 96 in accordance with the position of the beam with respect to the grid structure. This voltage is applied to the amplifier stages 96 and 97 which have their outputs connected to plus B through auxiliary deflecting coils 98 and 99 respectively. A sweep generator 100 provides the normal deflection through the main deflecting coils. The feedback provided from resistor 96 through the tubes 96 and 97 and the coils 98 and 99 produces auxiliary deflection fields so that the beam tends to follow along the top or bottom edge of the grid. It is obvious that a double grid structure can be used and can be connected in such manner that three positions of the beam are provided as in the system of Figs. 2 and 3.

Figures 11, 12, 13:
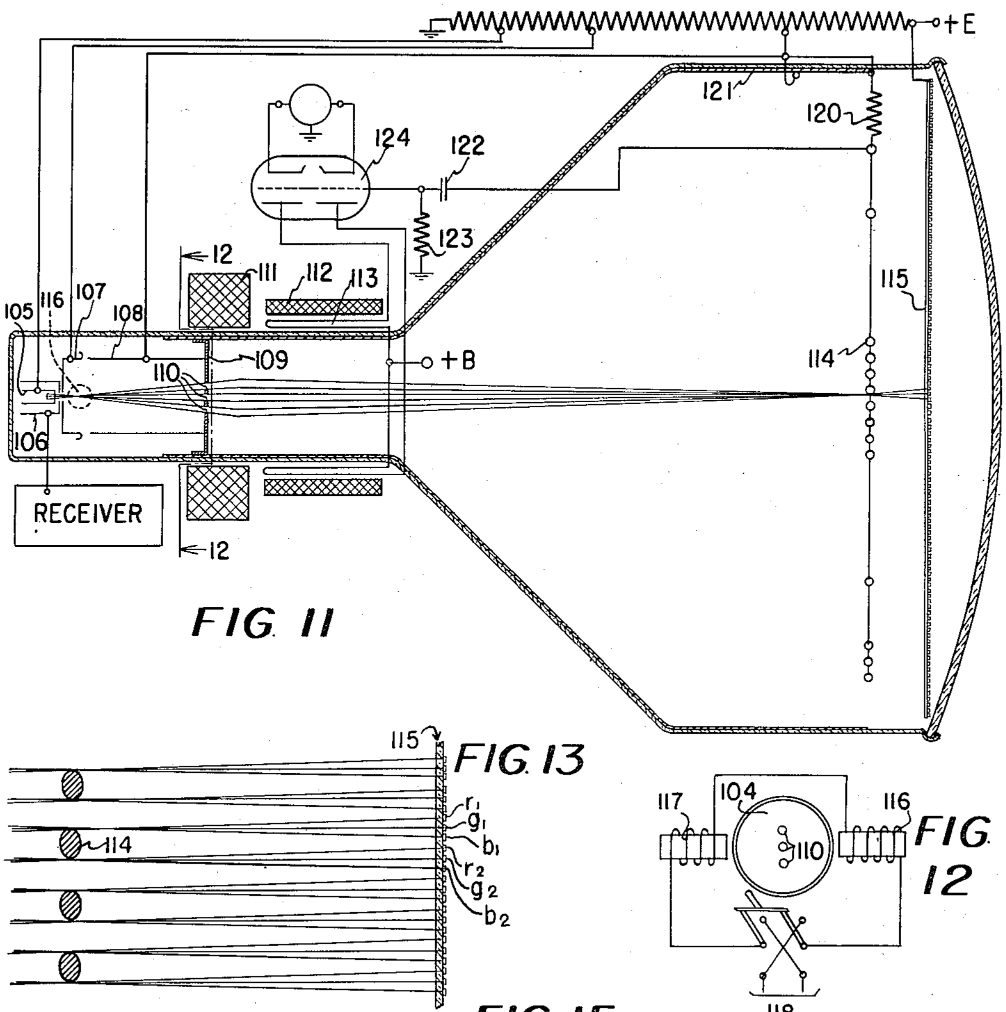
Fig. 11 illustrates a color television tube in which both the direction and the position of the beam is controlled.
Fig. 12 is a cross sectional view of the tube of Fig. 11 along the lines 12—12.
Fig. 13 is an enlarged view of the grid and screen structure of Fig. 11.

In Figs. 11 to 13 inclusive there is illustrated a further embodiment of the invention in which the beam is first deflected at the electron gun, is passed through an apertured plate, and is then focussed so that the direction of incidence of the beam on the screen is varied. The beam is also guided by a grid as previously described which is positioned near the screen. In Fig. 11 the electron gun is disclosed as including an electron emitting cathode 105, a grid 106 to which modulating signals are applied from the receiver, a first anode 107 connected to a positive potential, and a second anode 108 connected to a higher positive potential. The second anode 108 is terminated in a plate 109 having three apertures 110 therein instead of a single aperture as in standard tubes. After passing through the plate 109, the beam is focussed by a magnetic focussing device 111 and is deflected by a main deflection coil 112 and an auxiliary deflection coil 113. The beam is then directed through the grid structure 114 onto a screen 115.

For controlling the position of the beam with respect to the apertures 110 in the plate 109, a relative weak magnetic field is provided which is produced by the coils 116 and 117 (Fig. 12) positioned on opposide sides of the tube. These coils are schematically shown as connected to a source 118 through a reversing switch 119 so that the polarity of the field produced thereby can be reversed. It may be assumed that the beam will pass through the center opening or aperture 110 when no deflection field is provided and is deflected either upward or downward, depending upon the polarity of the field, to pass through the upper or lower aperture 110, as the case may be. It is to be pointed out that the apertures may be spaced in other configurations as may be desired and the field may be deflected in various other manners. The beam emerging from the apertures is then focussed by the magnetic means 111 onto the plane of the grid 114 so that a relatively small spot is provided where the beam impinges on the screen 115.

The grid 114 is connected through resistor 120 to a relatively high positive potential, being connected to the same point as the second anode 108 and the coating on the inside of the tube wall 121. The screen 115 may have a metal backing connected to a point of slightly higher potential and may thus serve as a collector for secondary emission from the grid 114 while its own secondary emission is effectively suppressed. The voltage from the grid 114 is applied through condenser 122 to resistor 123 and is applied to the grids of the triode section of the tube 124. The cathodes of these sections are connected in a gating circuit which selectively renders one or the other of the tube conducting. The plates of these tubes are connected to the auxiliary deflecting coil 113 to produce a field having a polarity depending upon which of the triode sections is rendered conducting. The operation of the grid 114 and the auxiliary deflecting coils 113 to cause the beam to take positions either along the top or bottom edge of the longitudinally extending portion of the grid 114 has been previously described and it is therefore not necessary to repeat the detailed description at this point.

The direction of incidence of the beam on the screen 115 will depend upon the original deflection of the beam and the aperture in the plate 109 through which it passes. This is illustrated in Fig. 13 which is an enlarged view of the grid structure 114 and the screen 115. The beam is then guided along the top and bottom edges of the portions of the grid 114 and strikes the screen at different points depending on the direction of the beam caused by the apertured plate 109 of the second anode. It therefore appears that by the combined use of different directions and the guiding effect of the grid, three different positions of the beam is provided along either edge of the portion of the grid. In a tube having a diagonal (or diameter) of 16 inches, the angle of incidence need be changed by only 40 minutes to provide the desired beam positions. The thickness of the grid portions should be substantially the same as the spacing therebetween, this dimension being approximately 23 mils for a tube of the size stated and for a definition of 400 lines. In such a tube the screen portions assigned to each color may have a width of the order of five mils.

The three positions resulting from different angles of incidence may be used to cause the beam to selectively scan red, green and blue portions on the screen 115. As illustrated in Fig. 13, the odd red, green and blue fields may be scanned when the beam is guided along the top edge of the grid portions with the three different colors being selected by the different direction of the beam. The even color fields may be produced by scanning along the bottom edge of the grid with the different angles providing the color selection. To provide interlaced lines as previously described the beam must first be made to follow along the top edge of the grid and be directed through the bottom opening of the plate 109 so that the beam has an upward angle to scan the odd red field $r_1$. To next scan the even green field, the beam would be deflected along the bottom edge of the grid portions and would be passed through the center aperture 110 to thereby scan the $g_2$ portions on the screen. The beam would then be guided along the top edge of the grid and be passed through the top aperture to be deflected downwardly to scan the even blue fields $b_1$. The beam would next be guided along the bottom edge of the grid portions and deflected upwardly for the even red fields $r_2$. Then the grid would be deflected along the top edge of the grid portions and through the center aperture for the odd green field $g_1$, and last would be deflected along the bottom edge and through the top aperture to provide the even blue field $b_2$. This sequence would then be repeated to continue the reproduction.

Figure 14:
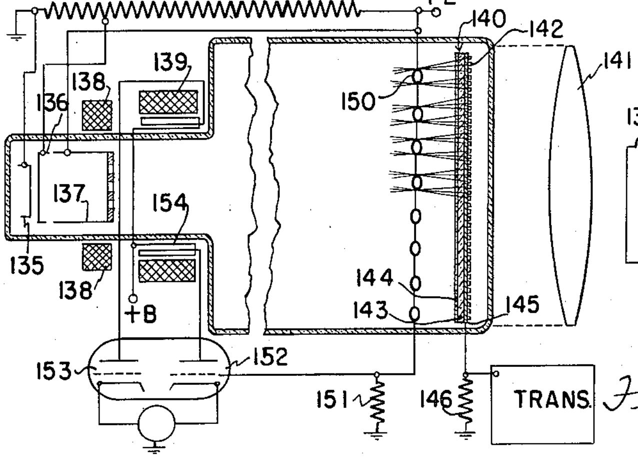
Fig. 14 illustrates a modification of the structure of Fig. 11.

Although the tube of Fig. 11 has been described for use in connection with a field sequential television system, this tube is also suitable for use in a dot sequential system. In such case the beam will have to be deflected past the various apertures 110 at a very rapid rate to assume the angles required for striking the various color portions within a very short period of time. This can be accomplished by placing the apertures in a triangular pattern as shown in Fig. 14, with the apertures 130 forming a triangle having one side thereof vertical. This arrangement can be used with the same grid and screen structures as illustrated in Figs. 11 and 13, and it is apparent that as the beam is spun past the three apertures it will strike the lines of the various colors in sequence. To provide such a rotating field the deflecting coils 131 and 132 may be fed by sine waves from a sweep generator 133 in a well known manner. No gating of the beam is required in this system as the plate 104 only allows the beam to pass when it strikes one of the apertures 130 so that the beam is automatically gated.

Figure 15:
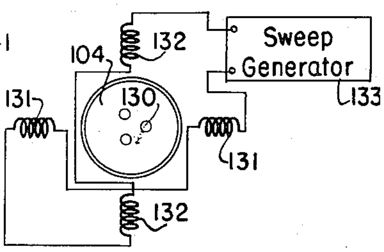
Fig. 15 illustrates the application of the invention to a color television transmitting tube.

In Fig. 15 there is illustrated a color television transmitting tube incorporating the principles of the invention. This tube includes a cathode 135, a first anode 136, a second anode 137, focussing means 138, main deflecting means 139, a screen structure 140 and a lens 141. The lens directs the object to be transmitted on the screen 140 causing an image to be formed on the fine lines 142 made of dyes of the various primary colors. The screen structure 140 includes a mica sheet 143 having photomosaic coating 144 on the back side and a very thin metallized coating 145 on the front side. This coating may preferably be made of tungsten or platinum. The colored dye is then placed on the metallic coating as very fine lines. When an image strikes the screen various colors will be transmitted through the various dyes and will strike the photomosaic to provide a charge thereon. This charge is applied to the metallic coating 145 by capacitive coupling therewith, and is then applied from the coating to the resistor 146 across which the signal is picked up.

To guide the electron beam on the screen structure 140, a grid structure 150 is provided in the manner previously described. This grid structure may serve as the collector and is connected to resistor 151 to provide a voltage to the triode sections 152 and 153 which are coupled to the auxiliary deflection coils 154. The auxiliary coils provide a field supplementing the main field to provide stable positions of the beam along the edges of the portions of the grid 150 as previously described. The second anode 137 is illustrated as including a plurality of apertures therein which may be in accordance with Fig. 12 or Fig. 14 for changing the direction to thereby provide three screen positions for each position along an edge of a grid portion. The tubes 152 and 153 may be gated in the manner previously described to control the position of the beam with respect to the grid portions.

It is to be pointed out that the system disclosed for guiding the beam of the tube can be used with other types of transmitter tubes including tubes which do not require a metal backing plate and therefore provide more efficient transfer of light to the screen. It is to be pointed out that tubes of such construction have no registration problems since a single beam and a single scanning yoke is used. As previously described, the grid and the color stripes can be very accurately constructed to eliminate any problem of registration therebetween.

Since the color tube disclosed does not require the use of a mask, the beam is not restricted at the screen to cause a loss of signal when used in a transmitter or a loss of brightness when used in a receiver. In systems in which the direction of the beam is changed by a deflecting field and an apertured plate in the electron gun, the beam is not substantially reduced since the lens apertures may be relatively large and of the same order of magnitude as the aperture in a standard electron gun. The system disclosed is not restricted as to size as are the mechanical systems which use a rotating mechanical filter. In a transmitting tube a further advantage is provided in that all color portions of the screen are exposed at all times as compared to mechanical systems in which the various colors are exposed in sequence.

It is to be noted that the various features illustrated in the several embodiments of the invention can be combined in various ways other than the ways shown to produce results which may be particularly advantageous in specific instances. In some of the drawings electromagnetic deflection is disclosed and in others electrostatic deflection. It will be obvious to those skilled in the art that these types of deflection are completely equivalent and in each embodiment of the invention one could be substituted for the other. Only one embodiment of the invention is illustrated in a transmitting tube but it is apparent that transmitting tubes of other construcions can be provided in accordance with the teaching of the invention. Other changes and substitutions may obviously be made within the scope of the invention.

Although the operation of the tube has been described in connection with the movement of a beam parallel to the elongated portions of the grid, it is obvious that such systems can also be used with the beam moving across the fluorescent portions and also across the elongated portions of the grid. In such operation, the auixiliary deflecting field will cause the beam to rest in one horizontal point for a time and then move rapidly to the next stable position at which it will rest for a time. Such guiding of the beam may be used to cause the beam to come to rest in sequence on fluorescent portions of various different colors and may be particularly advantageous for use in dot sequential systems as well as in field sequential systems. When used in this manner the gating of the switching tubes will have to be at a much faster rate. When used in dot sequential systems the arresting of the dot on the desired fluorescent portion will result in increased brightness over a continuous linear scan as has been fully explained in my copending application, Serial No. 189,731, filed October 12, 1950. It is also obvious that by proper gating of the system, the beam can be caused to scan the lines reproducing various colors in any desired sequence so that the system is also applicable to line sequential television systems.

It is apparent from the above that a color television tube is provided in which the electron beam is accurately guided so that it will closely follow a pattern including portions which correspond to various colors. As large differences of potential do not exist between closely spaced portions there is no problem of insulating the various portions to prevent insulation breakdown in the tube. The various grid structures and the arrangements of the portions of electron gun and the screen may be provided in simple and inexpensive manners so that the construction of the tubes will not be unduly complicated or extremely expensive.

Although various embodiments of the invention have been described which illustrate the same, it is obvious that various changes and modifications can be made therein, both as to the structure and as to the mode of operation thereof, and the intended scope of the invention is therefor to be limited only as defined in the appended claims.

I claim:

1. A color television system including in combination, means for producing a beam of electrons, screen means including a plurality of longitudinally extending fluorescent portions positioned in the path of said beam, said portions being constructed to produce different primary colors when impinged by said beam, means for deflecting said beam across said screen means, a conducting grid including portions extending in predetermined parallel relation to said fluorescent portions of said screen means, said grid being positioned in the path of said beam adjacent said screen means, said grid providing secondary emission therefrom which varies with the position of said beam with respect to said portions of said grid, an impedance element connected to said grid across which a voltage is developed which varies with the secondary emission from said grid and therefore varies with the position of said beam, and auxiliary deflecting means controlled by the voltage thereacross for providing a deflection field for said beam which varies with the position of said beam to hold said beam in predetermined positions with respect to said screen means, said auxiliary deflecting means including first and second portions selectively coupled to said impedance element and operating to hold said beam in different positions whereby said beam selectively impinges different fluorescent portions of said screen means to produce different primary colors.

2. A system for displaying images in color including electron beam producing means, fluorescent means including a plurality of groups of longitudinally extending portions positioned in the beam path, each of said groups including three portions arranged in a predetermined manner and individually producing one of three primary colors when impinged by a beam, deflecting means for moving said beam in sequence along said portions, a pair of conducting grids positioned in the beam path adjacent said fluorescent means, said grids including alternately spaced elongated portions which are positioned to correspond to said groups of portions of said fluorescent means, first and second means individually coupled to said grids for producing voltages varying with the position of said beam with respect to said portions of said grids, and feedback means coupled to said deflecting means for modifying the deflection field for said beam, said feedback means including portions coupled to said first and second means and selectively rendered operative for utilizing said voltages produced thereby for controlling said deflection field in opposite polarities to selectively hold said beam in a plurality of predetermined positions with respect to said portions of said grid, said feedback means including gating means connecting said portions of said feedback means to said first and second means so that said voltages thereacross are individually applied to said feedback means to modify said deflection field in one polarity to hold the beam in positions for scanning said fluorescent portions of one color, said gating means connecting said portions of said feedback means to said first and second means so that said voltages thereacross are individually applied to said feedback means to modify said deflection field in the opposite polarity to hold the beam in positions for scanning said fluorescent portions of a second color, said gating means connecting said portions of said feedback means to said first and second means so that said voltage thereacross in combination are applied to said feedback means for controlling said deflection field to hold the beam in positions for scanning said fluorescent portions of the third color.

3. A color television system including in combination, screen means including a conducting sheet and a plurality of parallel fluorescent strip portions adapted to produce different colors when impinged by an electron beam, electron beam producing means including a plurality of portions for respectively emitting electron beams which strike said screen means, said beam emitting portions being spaced with respect to each other in a direction generally perpendicular to said parallel strip portions of said screen means, conducting grid means positioned adjacent said screen means on the same side thereof as said beam producing means, said grid means including parallel grid portions in spaced parallel relation with said parallel strip portion of said screen means, common deflection means for deflecting said electron beams across said screen means, means for focusing said beams on said screen means, with the beams emitted from the different beam emitting portions approaching said grid means at different angles and selectively engaging said parallel fluorescent strip portions of said screen means which produce different colors, and means for applying a first positive potential to said grid means and a second positive potential higher than said first potential to said conducting sheet of said screen means.

4. A system for displaying images in color including means for producing a beam of electrons, fluorescent means including a plurality of longitudinally extending portions positioned in the path of said beam, said portions being adapted to produce different predetermined colors when impinged by said beam, means for deflecting said beam with respect to said portions, a pair of conducting grids positioned in the path of said beam adjacent said fluorescent means and providing secondary emission therefrom which varies with the position of said beam with respect thereto, said grids including alternately spaced elongated portions extending parallel to said portions of said fluorescent means, a pair of impedance elements individually connected to said grids for producing voltage varying with the position of said beam with respect to said portions of said grids, and auxiliary deflecting means for providing a deflection field for said beam which varies with the position of said beam, said auxiliary deflecting means including means selectively coupled to said impedance elements for selectively utilizing said voltages produced thereby and for controlling the polarity of said deflection field to selectively hold said beam in a plurality of predetermined positions with respect to said portions of said grid, whereby said beam strikes different portions of said fluorescent means and different colors are produced.

5. A system for displaying images in color including means for producing a beam of electrons, fluorescent means including a plurality of groups of longitudinally extending portions positioned in the path of said beam, each of said groups including two portions individually producing different colors when impinged by said beam, means for deflecting said beam along said portions, a metallic sheet positioned in the path of said beam adjacent said fluorescent means, a grid structure formed by material deposited on said metallic sheet, said grid structure including elongated portions positioned to correspond to said groups of portions of said fluorescent means, impedance means coupled to said grid means for producing a voltage varying with the position of said beam with respect to said portions of said grid means, and auxiliary deflecting means for said beam coupled to said impedance means for providing a deflection field which varies with the position of said beam, said auxiliary deflecting means including selective means for controlling the polarity of said deflection field to selectively hold said beam in positions along either of the sides of said elongated portions of said grids.

6. A system for displaying images in color including means for producing a beam of electrons, fluorescent means including longitudinally extending portions positioned in the path of said beam, said portions being adapted to produce predetermined colors when impinged by said beam, means for deflecting said beam in paths along said portions, a metallic sheet positioned in the path of said beam adjacent said fluorescent means, a grid structure formed of material deposited on said sheet, said grid structure including elongated portions extending parallel to said portions of said fluorescent means, and auxiliary deflecting means for said beam coupled to said sheet for providing a deflection field which varies with the position of said beam with respect to said elongated portions of said grid to hold said beam in predetermined relation with respect to said elongated portions.

7. A system for displaying images in color including means for producing a beam of electrons, fluorescent means including longitudinally extending portions positioned in the path of said beam, said portions being adapted to produce predetermined colors when impinged by said beam, means for deflecting said beam along said portions, a grid positioned in the path of said beam adjacent said fluorescent means, said grid including elongated portions extending parallel to said portions of said fluorescent means, and auxiliary deflecting means for said beam coupled to said grid for providing a deflection field which varies with the position of said beam with respect to said elongated portions of said grid to hold said beam in positions along the sides of said elongated portions, at least a part of said longitudinally extending portions of said fluorescent means being positioned on said elongated portions of said grid.

8. A system for displaying images in color including means for producing a beam of electrons, fluorescent means including a plurality of groups of longitudinally extending portions positioned in the path of said beam, each of said groups including two portions individually producing different colors when impinged by said beam, means for deflecting said beam along said portions, grid means positioned in the path of said beam adjacent said fluorescent means, said grid means including elongated portions positioned to correspond to said groups of portions of said fluorescent means, at least a part of said longitudinally extending portions of said fluorescent means being positioned on said elongated portions of said grid means, impedance means coupled to said grid means for producing a voltage varying with the position of said beam with respect to said portions of said grid means, and auxiliary deflecting means for said beam coupled to said impedance means for providing a deflection field which varies with the position of said beam, said auxiliary deflecting means including selective means for controlling the polarity of said deflection field to selectively hold said beam in one of two positions so that said beam selectively scans one of said portions of said groups.

9. A system for displaying images in color including means for producing a beam of electrons, fluorescent means including a plurality of groups of longitudinally extending portions positioned in the path of said beam, each of said groups including portions arranged in a predetermined manner and individually producing one of three primary colors when impinged by said beam, means for deflecting said beam in sequence along said portions, a pair of conducting grids positioned in the path of said beam adjacent said fluorescent means, said grids including alternately spaced elongated portions which correspond to said groups of portions of said fluorescent means, a pair of impedance elements individually connected to said grids for producing voltage varying with the position of said beam with respect to said portions of said grids, auxiliary deflecting means coupled to said impedance elements for providing a deflection field for said beam which varies with the position of said beam, said auxiliary deflecting means including gating means for selectively utilizing said voltages across said impedance elements and for controlling the polarity of said deflection field to selectively hold said beam in a plurality of predetermined positions with respect to said portions of said grids, and means providing gating waves to said gating means so that said beam scans said portions producing the different colors in sequence.

10. A system for displaying images in color including means for producing a beam of electrons, fluorescent means including a plurality of groups of longitudinally extending portions positioned in the path of said beam, each of said groups including three portions arranged in a predetermined manner and individually producing one of three primary colors when impinged by said beam, means for deflecting said beam in sequence along said portions, a pair of conducting grids positioned in the path of said beam adjacent said fluorescent means, said grids including alternately spaced elongated portions which are positioned to correspond to said groups of portions of said fluorescent means, a pair of impedance elements individually connected to said grids for producing voltages varying with the position of said beam with respect to said portions of said grids, and auxiliary deflecting means for providing a deflection field for said beam which varies with the position of said beam, said auxiliary deflecting means including selective means coupled to said impedance elements for selectively utilizing said voltages produced thereby and for controlling the polarity of said deflection field to selectively hold said beam in a plurality of predetermined positions with respect to said portions of said grid, with said voltages being individually utilized in one polarity to hold the beam in positions for scanning said fluorescent portions of one color, said voltages being individually utilized in the opposite polarity to hold the beam in a position for scanning said fluorescent portions of a second color, and said voltages being utilized in combination to hold the beam in position for scanning said fluorescent portions of the third color.

11. A system for displaying images in color including means for producing a beam of electrons, fluorescent means including a plurality of groups of longitudinally extending portions positioned in the path of said beam, means for deflecting said beam in sequence along said portions, a pair of conducting grids positioned in the path of said beam adjacent said fluorescent means, said grids including alternately spaced elongated portions which are positioned to correspond to said groups of portions of said fluorescent means, said groups of longitudinally extending portions including first and second portions for producing first and second colors secured to opposite sides of said elongated portions of said grids and a third portion for producing a third color positioned intermediate adjacent portions of said grids, a pair of impedance elements individually connected to said grids for producing voltages varying with the position of said beam with respect to said portions of said grids, and auxiliary deflecting means for providing a deflection field for said beam which varies with the position of said beam, said auxiliary deflecting means including selective means coupled to said impedance elements for selectively utilizing said voltages produced thereby and for controlling the polarity of said deflection field to selectively hold said beam in positions along each side of said portions of said grids and in a position intermediate adjacent portions of said grids.

12. A system for displaying images in color including means for producing a beam of electrons, fluorescent means including a plurality of groups of longitudinally extending portions positioned in the path of said beam, means for deflecting said beam in sequence along said portions, a pair of conducting grids positioned in the path of said beam adjacent said fluorescent means, said grids including alternately spaced elongated portions which are positioned to correspond to said groups of portions of said fluorescent means, said groups of longitudinally extending portions including first and second portions for producing first and second colors secured to opposite sides of said elongated portions of said grids and a third portion for producting a third color positioned intermediate adjacent portions of said grids, a pair of impedance means individually connected to said grids for producing voltages varying with the position of said beam with respect to said portions of said grids, and auxiliary deflecting means for providing a deflection field for said beam which varies with the position of said beam, to selectively hold said beam in positions along each side of said portions of said grids and in a position intermediate adjacent portions of said grids.

13. A color television system including in combination, means for producing a beam of electrons including means positioned in the path of said beam having three spaced apertures therein through which said beam may pass, said apertures in said plate being positioned substantially in a straight line, screen means positioned in the path of said beam including a plurality of longitudinal portions corresponding to three primary colors which extend in a direction perpendicular to said line of apertures, means for focussing said beam passing through said apertures on said screen means, with said beam impinging said screen means at different angles depending upon the aperture through which said beam passes, grid means positioned in the path of said beam including longitudinal portions spaced from said screen means and extending parallel to said portions of said screen means, main deflecting means for deflecting said focussed beam along said grid portions, said grid means providing secondary emission which varies with the position of said beam with respect to said grid portions, an auxiliary deflecting means coupled to said grid means and controlled by said secondary emission holding said beam along the edges of said grid portions, with said beam striking portions of said screen of different colors depending upon the direction of said beam.

14. A color television system including in combination, means for producing a beam of electrons including an obstructing plate positioned in the path of said beam having a plurality of apertures therein through which said beam may pass, said apertures in said plate being positioned in a straight line, means for selectively moving said beam along said line to positions in registration with said apertures, screen means positioned in the path of said beam including a plurality of longitudinal portions corresponding to the primary colors which extend in a direction perpendicular to said line of apertures, means for focussing said beam passing through said apertures on said screen, with said beam impinging said screen at different angles depending upon the aperture through which said beam passes, main deflecting means for deflecting said focussed beam across said screen, grid means positioned in the path of said beam including longitudinal portions spaced from said screen means and extending parallel to said portions of said screen means, said grid means providing secondary emission which varies with the position of said beam with respect to said grid portions, and auxiliary deflecting means coupled to said grid means and controlled by said secondary emission for controlling the position of said beam with respect to said grid portions, with the position of said beam at said screen varying from the position of said beam at said grid depending upon the direction of said beam.

15. A color television system including in combination, electron beam producing means including a plurality of portions spaced substantially in a straight line from which beams of electrons are emitted, screen means positioned in the path of said beams including a plurality of portions corresponding to the primary colors, means for focussing said beams emitted from said portions on said screen with said beams impinging said screen at different angles depending upon the portion from which each beam is emitted, main deflecting means for deflecting said beams across said screen, conducting grid means positioned in the path of said beam spaced from said screen means, said grid means producing secondary emission which varies with the position of said beams with respect to said grid means, and auxiliary deflecting means coupled to said grid means and controlled by said secondary emission therefrom for controlling the position of said beams at said grid, with the position of said beams on said screen being controlled by the position of said beam at said grid and the direction of said beams.

16. A color television system including in combination, means for producing a beam of electrons including an obstructing plate positioned in the path of said beam having apertures therein through which said beam may pass, means for selectively moving said beam to positions in registration with said apertures, screen means positioned in the path of said beam including a plurality of portions corresponding to the primary colors, means for focussing said beam passing through said apertures on said screen with said beam having an angle of incidence with said screen depending upon the aperture through which said beam passes, main deflecting means for deflecting said focussed beam across said screen, grid means positioned in the path of said beam and spaced from said screen means, and auxiliary deflecting means coupled to said grid means for controlling the position of said beam at said grid, with the position of said beam on said screen being controlled by the position of said beam at said grid and the direction of said beam.

17. A color television system including in combination, means for producing a beam of electrons including an obstructing plate positioned in the path of said beam having three spaced apertures arranged in a straight line therein through which said beam may pass, means for selectively moving said beam so that it is directed through said apertures in a predetermined sequence, screen means positioned in the path of said beam including a plurality of elongated portions extending perpendicular to said line and arranged in groups each of which includes portions of three primary colors, means for focussing said beam emerging from said apertures on said screen means with said beam impinging said screen at different angles depending upon the aperture through which said beam passes, conducting means spaced from said screen means causing said beam to impinge portions of said screen means corresponding to different colors depending upon the angle of incidence of said beam with respect to said screen means, and means for applying a first potential to said conducting means and a second potential higher than said first potential to said screen means.

18. A color television system including in combination, screen means including a conducting portion and a plurality of parallel portions adapted to produce different colors when impinged by an electron beam, electron beam producing means including a plurality of beam emitting portions spaced with respect to each other in a direction generally perpendicular to said parallel screen portions, conducting grid means positioned adjacent said screen means in the path of said beams and including parallel portions aligned with said parallel screen portions, means for deflecting said electron beams across said screen means, means for focusing said beams on said screen means with said beams passing through said grid means and impinging said screen means at different angles depending upon the position of the portion from which each beam is emitted, anode means providing a field for accelerating said beams, and means for applying a first potential to said anode means and to said grid means and a second potential higher than said first potential to said screen means.

19. A color television system including in combination, screen means including a conducting portion and a plurality of parallel portions adapted to produce different colors when impinged by an electron beam, electron beam producing means including a plurality of beam emitting portions spaced with respect to each other in a direction perpendicular to said parallel screen portions, conducting grid means positioned adjacent said screen means and including parallel portions aligned with said parallel screen portions, means for focusing the beam from each of said beam producing portions on said screen means with said beam passing through said grid means and impinging said screen means at a particular angle depending upon the position of the portion from which said beam is emitted, means for deflecting said beam across said screen means, anode means providing a field for accelerating said beams, and means for applying a first potential to said anode means and to said grid means and a second potential higher than said first potential to said screen means.

20. A color television system including in combination, screen means including a conducting portion and a plurality of parallel portions adapted to produce different colors when impinged by an electron beam, electron beam producing means including a plurality of beam emitting portions spaced with respect to each other in a direction generally perpendicular to said parallel screen portions, conducting grid means positioned adjacent said screen means and including parallel portions aligned with said parallel screen portions, means for deflecting said electron beams across said screen means, means for focusing said beams on said screen means with said beams passing through said grid means and impinging said screen means at different angles depending upon the position of the portion from which each beam is emitted, anode means providing a field for accelerating said beams, means for applying a first potential to said anode means and a second potential higher than said first potential to said screen means, and means applying said first potential to said conducting grid means for controlling the position at which said beams impinge said screen means.

21. A color television system including in combination, means for producing a beam of electrons including an obstructing plate positioned in the path of said beam having three spaced apertures therein through which said beam may pass, said apertures in said plate being arranged in the form of a triangle, means producing a revolving field for moving said beam to positions in registration with said apertures, screen means positioned in the path of said beam including a plurality of longitudinal portions corresponding to three primary colors which extend in a direction perpendicular to one side of said triangle, means for focussing said beam passing through said apertures on said screen, with said beam impinging said screen at different angles depending upon the aperture through which said beam passes, grid means positioned in the path of said beam including longitudinal portions spaced from said screen means and extending parallel to said portions of said screen means, main deflecting means for deflecting said focussed beam along said grid portions, said grid means providing secondary emission which varies with the position of said beam with respect to said grid portions, and auxiliary deflecting means coupled to said grid means and controlled by said secondary emission holding said beam along the edges of said grid portions, with said beam striking portions of said screen of different colors depending upon the direction of said beam.

22. A color television system including in combination, means for producing a beam of electrons including an obstructing plate positioned in the path of said beam having three spaced apertures arranged in the form of a triangle therein through which said beam may pass, means producing a revolving field for moving said beam so that it is directed through said apertures in a predetermined sequence, screen means positioned in the path of said beam including a plurality of elongated portions extending perpendicular to one side of said triangle and arranged in groups each of which includes portions of three primary colors, means for focussing said beam emerging from said apertures on said screen with said beam impinging said screen at different angles depending upon the aperture through which said beam passes, and means spaced from said screen causing said beam to impinge portions of said screen corresponding to different colors depending upon the angle of incidence of said beam with respect to said screen.

23. A system for displaying images in color including in combination, means for producing a beam of electrons, fluorescent means including elongated strip-like portions positioned in the path of said beam, said portions being constructed of materials arranged in a repeating series so that different predetermined colors are produced as said portions are impinged by said beam, means for deflecting said beam across said fluorescent means, a conductive sheet positioned in the path of said beam adjacent said fluorescent means, a grid structure formed of material having different secondary emission properties than that of said conductive sheet, said grid structure including elongated portions extending substantially parallel to said portions of said fluorescent means, and means controlled by the secondary emission from said grid structure coupled to said beam deflecting means to vary the position of said beam with respect to said elongated portions of said grid structure to hold said beam in predetermined relation with respect thereto.

24. A system for displaying images in color including in combination, means for producing a beam of electrons, fluorescent means including elongated portions positioned in the path of said beam, means for deflecting said beam across said fluorescent means, said portions being constructed of materials arranged so that a repeating series of different predetermined colors are produced as said beam is deflected across said fluorescent means, a conductive sheet positioned in the path of said beam adjacent said fluorescent means, a grid structure formed of material having different secondary emission properties than that of said conductive sheet, said grid structure including elongated portions extending substantially parallel to said portions of said fluorescent means, and control means for said system responsive to the secondary emission from said grid structure.

25. Apparatus for displaying images in color including in combination, means for producing a beam of electrons, fluorescent means including elongated strip-like portions positioned in the path of said beam, said portions being constructed of materials arranged so that a repeating series of different predetermined colors are produced thereby when impinged by said beam, a conductive sheet positioned in the path of said beam adjacent said fluorescent means, and a grid structure formed of material having different secondary emission properties than that of said conductive sheet, said grid structure including elongated portions extending substantially parallel to said portions of said fluorescent means.

26. Apparatus for displaying images in color including in combination, means for producing a beam of electrons, fluorescent means including elongated portions positioned in the path of said beam, said portions being constructed of materials and arranged to produce a repeating series of different predetermined colors when impinged by said beam, a metallic sheet positioned in the path of said beam adjacent said fluorescent means, and a grid structure deposited on said metallic sheet and including elongated portions extending parallel to said portions of said fluorescent means, said grid structure being formed of material which, when impinged by said beam of electrons, produces less secondary emission than that produced by said metallic sheet.

References Cited in the file of this patent

UNITED STATES PATENTS

| | | |
|---|---|---|
| 2,165,028 | Blumlein | July 4, 1939 |
| 2,343,825 | Wilson | Mar. 7, 1944 |
| 2,417,450 | Sears | Mar. 18, 1947 |
| 2,446,249 | Schroeder | Aug. 3, 1948 |
| 2,446,440 | Swedlund | Aug. 3, 1948 |
| 2,461,515 | Bronwell | Feb. 15, 1949 |
| 2,490,812 | Huffman | Dec. 13, 1949 |
| 2,518,200 | Sziklai et al. | Aug. 8, 1950 |
| 2,529,485 | Chew | Nov. 14, 1950 |
| 2,532,511 | Okolicsanyi | Dec. 5, 1950 |
| 2,540,016 | Sunstein | Jan. 30, 1951 |
| 2,543,477 | Sziklai et al. | Feb. 27, 1951 |
| 2,564,908 | Kuchinsky | Aug. 21, 1951 |
| 2,573,777 | Sziklai | Nov. 6, 1951 |
| 2,577,038 | Rose | Dec. 4, 1951 |
| 2,579,665 | Green | Dec. 25, 1951 |
| 2,590,764 | Forgue | Mar. 25, 1952 |
| 2,602,145 | Law | July 1, 1952 |
| 2,611,099 | Jenny | Sept. 16, 1952 |
| 2,611,816 | Darke | Sept. 23, 1952 |
| 2,630,548 | Muller | Mar. 3, 1953 |
| 2,631,259 | Nicoll | Mar. 10, 1953 |
| 2,634,325 | Bond et al. | Apr. 7, 1953 |
| 2,684,454 | Huffman | July 20, 1954 |

FOREIGN PATENTS

| | | |
|---|---|---|
| 443,896 | Great Britain | Mar. 10, 1936 |
| 866,065 | France | Mar. 31, 1941 |